(12) United States Patent
Leroux et al.

(10) Patent No.: US 11,631,216 B2
(45) Date of Patent: Apr. 18, 2023

(54) METHOD AND SYSTEM FOR FILTERING SHADOW MAPS WITH SUB-FRAME ACCUMULATION

(71) Applicant: Unity IPR ApS, Copenhagen (DK)

(72) Inventors: Jean-Philippe Leroux, Mascouche (CA); Yohann Christophe Vaast, Montreal (CA)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 17/303,083

(22) Filed: May 19, 2021

(65) Prior Publication Data
US 2021/0366184 A1    Nov. 25, 2021

Related U.S. Application Data

(60) Provisional application No. 63/027,330, filed on May 19, 2020.

(51) Int. Cl.
*G06T 15/20*    (2011.01)
*G06T 15/60*    (2006.01)
*G06T 1/20*     (2006.01)
*G06T 13/20*    (2011.01)
(Continued)

(52) U.S. Cl.
CPC .............. *G06T 15/60* (2013.01); *G06T 1/20* (2013.01); *G06T 13/20* (2013.01); *G06T 15/005* (2013.01); *G06T 15/04* (2013.01); *G06T 2215/12* (2013.01)

(58) Field of Classification Search
CPC ....... G06T 15/005; G06T 19/006; G06T 1/20; G06T 15/04; G06T 15/60; G06T 17/00; G06T 1/60; G06T 13/20; G06T 2215/12
See application file for complete search history.

(56) References Cited

U.S. PATENT DOCUMENTS

| | | | | |
|---|---|---|---|---|
| 10,456,116 B2 * | 10/2019 | Duncan | ................ | A61B 8/5253 |
| 2010/0134492 A1 * | 6/2010 | Ford | ........................ | G06T 15/80 |
| | | | | 345/426 |

(Continued)

FOREIGN PATENT DOCUMENTS

CN          107967670 A  *   4/2018   ............... A61B 8/00

OTHER PUBLICATIONS

"European Application Serial No. 21174839.7, Extended European Search Report dated Oct. 13, 2021", 9 pages.

(Continued)

*Primary Examiner* — Abderrahim Merouan
(74) *Attorney, Agent, or Firm* — Schwegman Lundberg & Woessner, P.A.

(57) ABSTRACT

A method of rendering an image of an environment is disclosed. Environment data for the environment is accessed. The environment data corresponds to a frame of a video. A plurality of subframes associated with the frame is determined. An angle for each of the plurality of subframes is determined. One or more lights corresponding to the environment are selected. For each light of the one or more lights, a shadow map is generated. The shadow map corresponds to a subframe of the plurality of subframes based on a frustum view oriented at the angle determined for the subframe. The image of the environment is rendered. The rendering includes using the generated shadow map for each light of the one or more lights.

20 Claims, 11 Drawing Sheets

(51) Int. Cl.
*G06T 15/00* (2011.01)
*G06T 15/04* (2011.01)

(56) References Cited

U.S. PATENT DOCUMENTS

| | | | | |
|---|---|---|---|---|
| 2011/0249878 | A1* | 10/2011 | Pagoulatos | G01S 15/8995 382/131 |
| 2015/0097825 | A1* | 4/2015 | Fortin | A63F 13/525 345/419 |
| 2015/0297949 | A1* | 10/2015 | Aman | G06T 7/246 348/157 |
| 2015/0302545 | A1* | 10/2015 | Harris | G06T 1/20 345/501 |
| 2016/0089116 | A1* | 3/2016 | Duncan | A61B 8/5207 600/440 |
| 2017/0358104 | A1* | 12/2017 | Zhang | G06K 9/00724 |
| 2017/0365090 | A1* | 12/2017 | Hazel | G06T 15/40 |
| 2021/0366184 | A1* | 11/2021 | Leroux | G06T 13/20 |

OTHER PUBLICATIONS

Brabec, S, "Shadow techniques for interactive and realtime applications", Dissertation to Obtain the Degree of Doctoral Engineering Sciences of The Natural Scientific and Technical Facilities of The University Of Saarland (Dec. 18, 2003), pp. 1-174.

Daniel, Scherzer, "Pixel-Correct Shadow Maps with Temporal Reprojection and Shadow Test Confidence", Eurographics Symposium on Rendering, XP055412744, https://www.cg.tuwien.ac.at research publications 2007 Scherzer-2007-PCS Scherzer-2007-PCS-Preprint.pdf, (Jan. 1, 2007), 6 pages.

Lance, Williams, "Casting curved shadows on curved surfaces", Computer Graphics and Interactive Techniques, ACM, 2 Penn Plaza, Suite 701 New York NY 10121-0701 USA, (Aug. 23, 1978), pp. 270-274.

Canadian Application Serial No. 3,119,135, Office Action dated Aug. 1, 2022, 5 pgs.

European Application Serial No. 21174839.7, Response Filed May 24, 2022 to Extended European Search Report dated Oct. 13, 2021, 12 pgs.

\* cited by examiner

METHOD AND SYSTEM FOR FILTERING SHADOW MAPS WITH SUB-FRAME ACCUMULATION

CROSS-REFERENCE TO RELATED APPLICATIONS

This application claims the benefit of U.S. Provisional Application No. 63/027,330, filed May 19, 2020, entitled "METHOD AND SYSTEM FOR FILTERING SHADOW MAPS WITH SUB-FRAME ACCUMULATION," which is incorporated by reference herein in its entirety.

TECHNICAL FIELD

The subject matter disclosed herein generally relates to the technical field of computer graphics systems, and in one specific example, to computer systems and methods for rendering shadows in computer graphics.

BACKGROUND OF THE INVENTION

Various tools exist to allow shadows to be added to computer graphics (shadow mapping). However, shadow mapping even at high resolution can introduce noise in graphics. This may happen through the introduction of spatial aliasing artifacts (e.g., jaggines) in a rendered graphic image since the coverage of a shadow map texel is often larger than a pixel. These artifacts can be smoothed out through filtering but at the cost of losing precision, sharpness and introducing light leak. The artifacts are particularly visible on clean surfaces (e.g., a surface with only low frequency detail), and at grazing angles creating long stripes of shadow. Due to the way the human visual system works, the artifacts may be very noticeable during an animation, introducing noise.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

Figure 1:
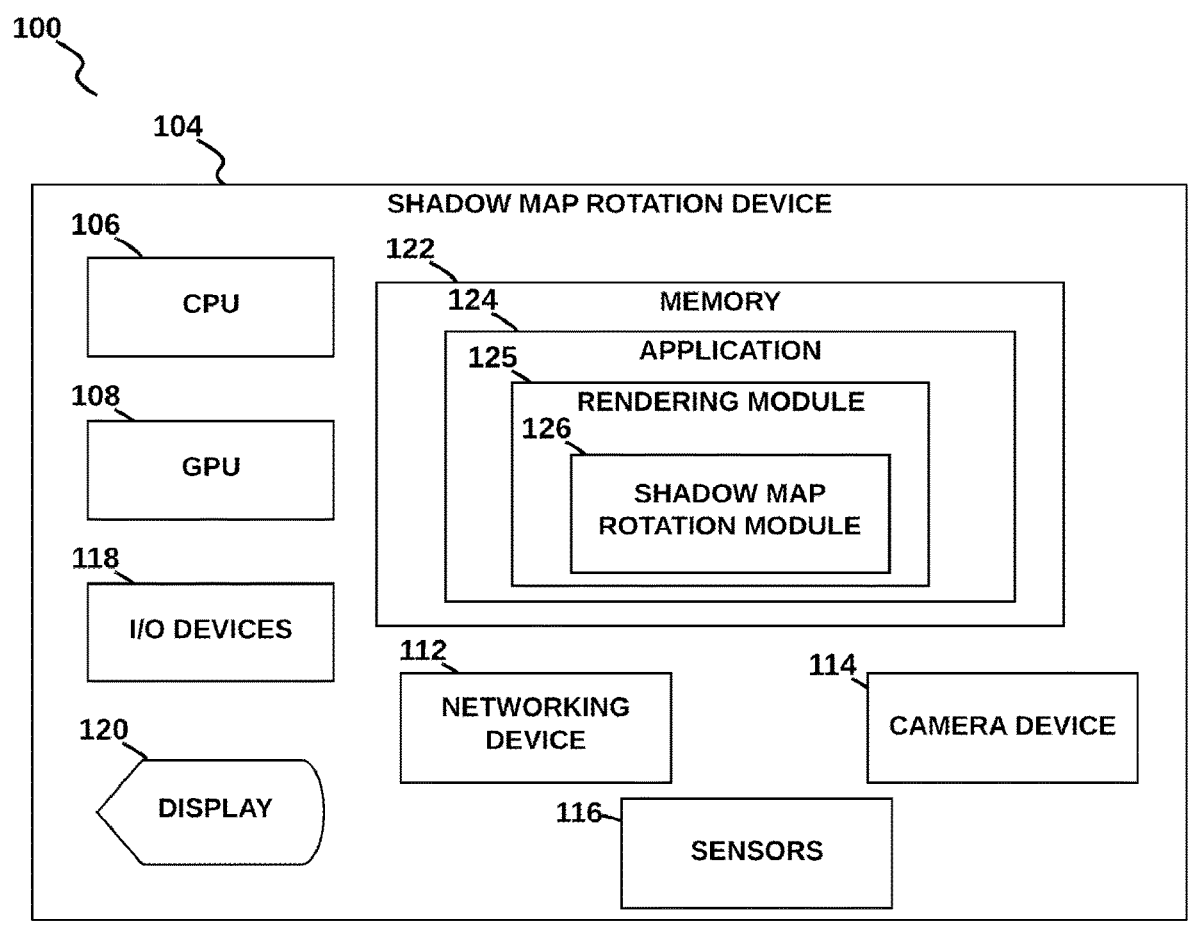
FIG. 1 is a schematic illustrating a shadow map rotation system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D scene environments, 2D simulation environments, 2D content creation environments, and the like), 3D digital environments (e.g., 3D game environments, 3D simulation environments, 3D scene environments, 3D content creation environment, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset' and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

A method of rendering an image of an environment is disclosed. Environment data for the environment is accessed. The environment data corresponds to a frame of a video. A plurality of subframes associated with the frame is determined. An angle for each of the plurality of subframes is determined. One or more lights corresponding to the environment are selected. For each light of the one or more lights, a shadow map is generated. The shadow map corresponds to a subframe of the plurality of subframes based on a frustum view oriented at the angle determined for the subframe. The image of the environment is rendered. The rendering includes using the generated shadow map for each light of the one or more lights.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits to digital content creators. For example, the systems and methods described herein improve a quality of rendered shadows (e.g., reducing jagged edges) in digital content (e.g., movies) without use of shadow filtering techniques thus improving an efficiency of computation of rendered images on a computer. The systems and methods described herein may be used to reduce shadow artifacts including jagged shadow edges and light leaks displayed in moving shadows in digital content such as videos (e.g., videos that use motion blurring techniques), wherein the reducing of the shadow artifacts avoids a use of computationally intensive shadow filtering techniques.

Turning now to the drawings, systems and methods, including non-routine or unconventional components or operations, or combinations of such components or operations, for accumulated shadow map rotation in accordance with embodiments of the invention are illustrated. In accordance with an embodiment, FIG. 1 is a diagram of an example shadow map rotation system 100 and associated devices configured to provide shadow map rotation functionality. In accordance with an embodiment, the shadow map rotation device 104 is a computing device capable of providing a digital environment to a user 102. In some embodiments, the shadow map rotation device 104 is a mobile computing device, such as a smartphone, a tablet computer, or a head mounted display (HMD) device while in other embodiments, the shadow map rotation device 104 is a computing device such as a desktop computer or workstation.

In accordance with an embodiment, the shadow map rotation device 104 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2A, FIG. 2B, FIG. 3, FIG. 4A, FIG. 4B, FIG. 5, FIG. 6A and FIG. 6B. The shadow map rotation device 104 may also include one or more networking devices 112 (e.g., wired or wireless network adapters) for communicating across a network. The shadow map rotation device 104 may also include one or more camera devices 114 which may be configured to capture digital video of the real world near the device 104. The shadow map rotation device 104 may also include one or more sensors 116, such as a global positioning system (GPS) receiver (e.g., for determining a GPS location of the shadow map rotation device 104), biometric sensors (e.g., for capturing biometric data of the user 102), motion or position sensors (e.g., for capturing position data of the user 102 or other objects), or an audio microphone (e.g., for capturing sound data). Some sensors 116 may be external to the shadow map rotation device 104, and may be configured to wirelessly communicate with the shadow map rotation device 104 (e.g., such as used in the Microsoft Kinect®, Vive Tracker™, MIT's Lidar sensor, or MIT's wireless emotion detector).

The shadow map rotation device 104 also includes one or more input devices 118 such as, for example, a mouse, a keyboard, a keypad, a touch screen, a microphone, a pointing device, a camera, a hand-held device (e.g., hand motion tracking device), and the like, for inputting information in the form of a data signal readable by the processing device 106. The shadow map rotation device 104 further includes one or more display devices 120, such as a touchscreen of a tablet or smartphone, or lenses or visor of a VR or AR HMD, which may be configured to display virtual objects. The display device 120 may be driven or controlled by one or more GPUs 108. The GPU 108 processes aspects of graphical output that assists in speeding up rendering of output through the display device 120.

The shadow map rotation device 104 also includes a memory 122 configured to store a shadow map rotation module 126. The memory 122 can be any type of memory device, such as random access memory, read only or rewritable memory, internal processor caches, and the like. The memory 122 also stores an application 124 (e.g., executed by the CPU 106 or GPU 108) that communicates with the display device 120 and also with other hardware such as the input/output device(s) 118 to present a digital environment (e.g., a 3D video game or a 3D content creation environment) on the display device 120. In accordance with an embodiment, the application may be a digital content creation application that provides tools (e.g., user interfaces via the display device) for creating digital content including video games, movies, television shows and more. In accordance with an embodiment, the application may include a content creation engine, whereby the content creation engine would typically include one or more modules that provide the following: animation physics for digital objects, collision detection for digital objects, rendering, networking, sound, animation, and the like in order to provide a digital environment for display on the display device 120. In accordance with an embodiment, the application 124 may include a rendering module 125 (e.g., within the content creation engine) for rendering parts of a digital environment into an image or series of images (e.g., as part of a movie). In accordance with an embodiment, the rendering module 125 may include a shadow map rotation module 126 that performs operations as described below with respect to FIG. 2A, FIG. 2B, FIG. 3, FIG. 4A, FIG. 4B, FIG. 5, FIG. 6A and FIG. 6B. Although the shadow map rotation module 126 is shown as a part of the rendering module 125 and application 124, the shadow map rotation module 126 may be implemented separately from the application 124 and/or separately from the rendering module 125 (e.g., as a plugin or as a completely separate application).

In some embodiments, the shadow map rotation system 100 and the various associated hardware and software components described herein may provide augmented reality (AR) content instead of, or in addition to, virtual reality (VR) content (e.g., in a mixed reality (MR) environment). It should be understood that the systems and methods described herein may be performed with AR content and VR content, and as such, the scope of this disclosure covers both AR and VR applications.

Figure 2A:
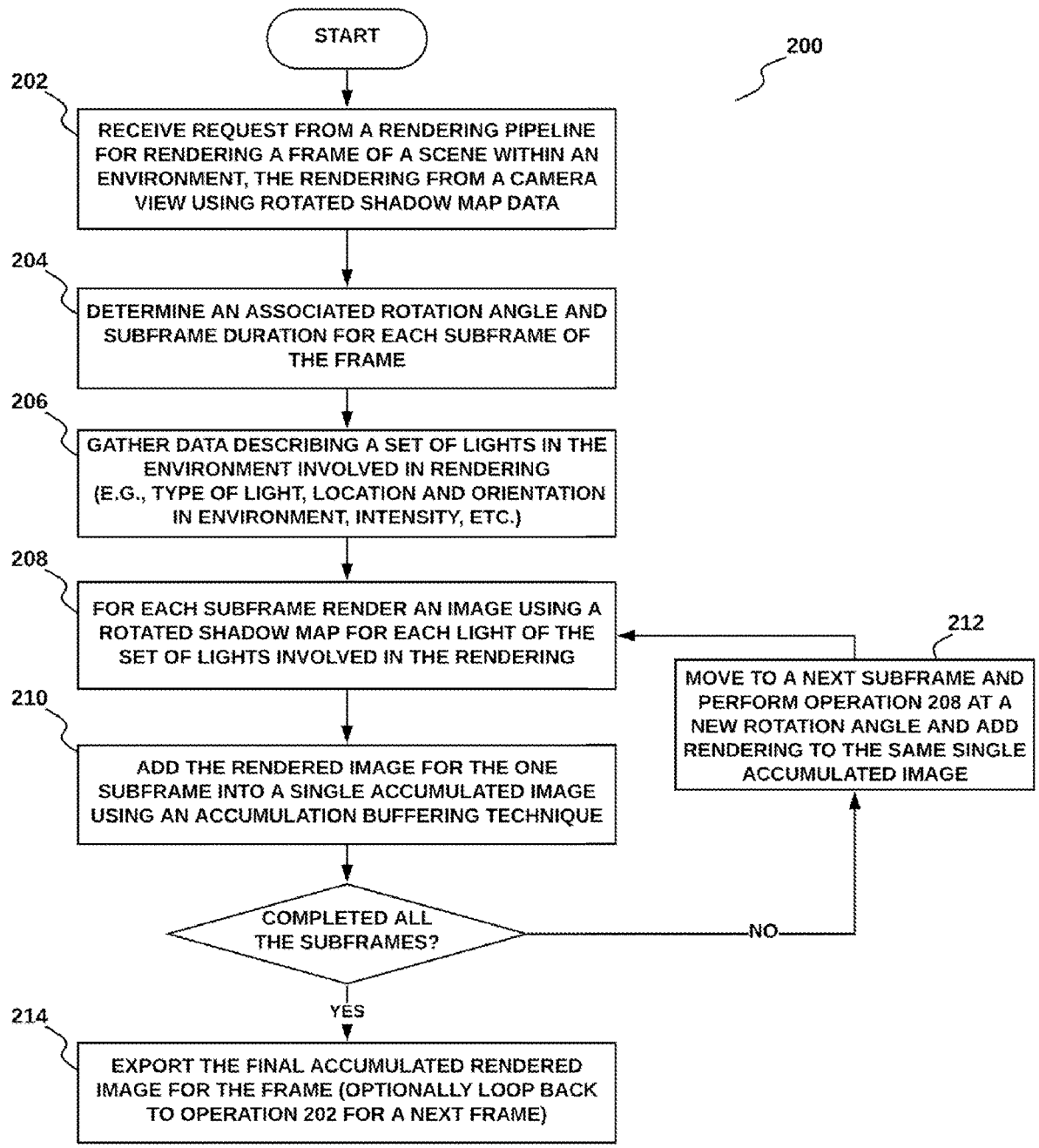
FIG. 2A is a flowchart illustrating a rotated shadow map method using a shadow map rotation system, in accordance with one embodiment.

In accordance with an embodiment, and shown in FIG. 2A is a flowchart of a method 200 for rendering images using a plurality of rotation maps over a plurality of subframes. The method 200 shown in FIG. 2A may be referred to herein as the rotated shadow map method. The method 200 may be used in conjunction with the shadow map rotation system 100 as described with respect to FIG. 1. In various embodiments, some of the method elements shown may be performed concurrently, in a different order than shown, or may be omitted. The method 200 may be used as part of a rendering pipeline (e.g., executing within the rendering module 125) to generate one or more rendered images from an environment for a frame (e.g., a rendering of a 3D environment for frames in a movie). In accordance with an embodiment, at operation 202 of the method 200, the shadow map rotation module 126 receives a rendering request from the rendering pipeline to render a scene from a camera view within the environment using the rotated shadow map method 200. The request may be to render an image for a frame. In accordance with an embodiment, the request includes frame data, which includes one or more of the following: data describing an image to be rendered for the frame, data describing shadow map parameters for the frame, and data describing subframe parameters for the frame. In accordance with an embodiment, the data describing an image to be rendered may include camera data (e.g., position, orientation, view frustum, camera parameters, and more in order to position, orient and frame a frustum view of the camera within the environment), and environment data (e.g., 3D model data, texture data, rendering options, and more). In accordance with an embodiment, the environment data may provide a link to an environment rather than directly providing 3D model data and texture data. In accordance with an embodiment, the data describing shadow map parameters includes one or more of the following data describing a shadow map: shadow map resolution, shadow map size, shadow map shape (e.g., 2D rectangular, 2D square, and cube), shadow map cascade parameters (e.g., number, size, resolution of each cascade), and more. In accordance with an embodiment, the data describing subframe parameters may include data that describes a number of subframes and rotation angles for the number of subframes. For example, the subframe parameters may include a rotation angle for a shadow map associated with each of the number of subframes, and a total rotation angle for the shadow maps.

In accordance with an embodiment, the shadow map parameters and the subframe parameters may be predetermined by an external agent (e.g., a rendering engineer, 3D graphic artist, and the like) to provide high quality rendering of shadows using the method 200. For example, the number of subframes may be increased to provide a higher quality of artifact averaging (e.g., during operation 210 described below), or the number of subframes may be reduced to reduce an amount of computation during operation. Similarly, the total rotation angle for the shadow maps may be increased to provide a larger distribution of artifacts for artifact averaging.

Figure 3:
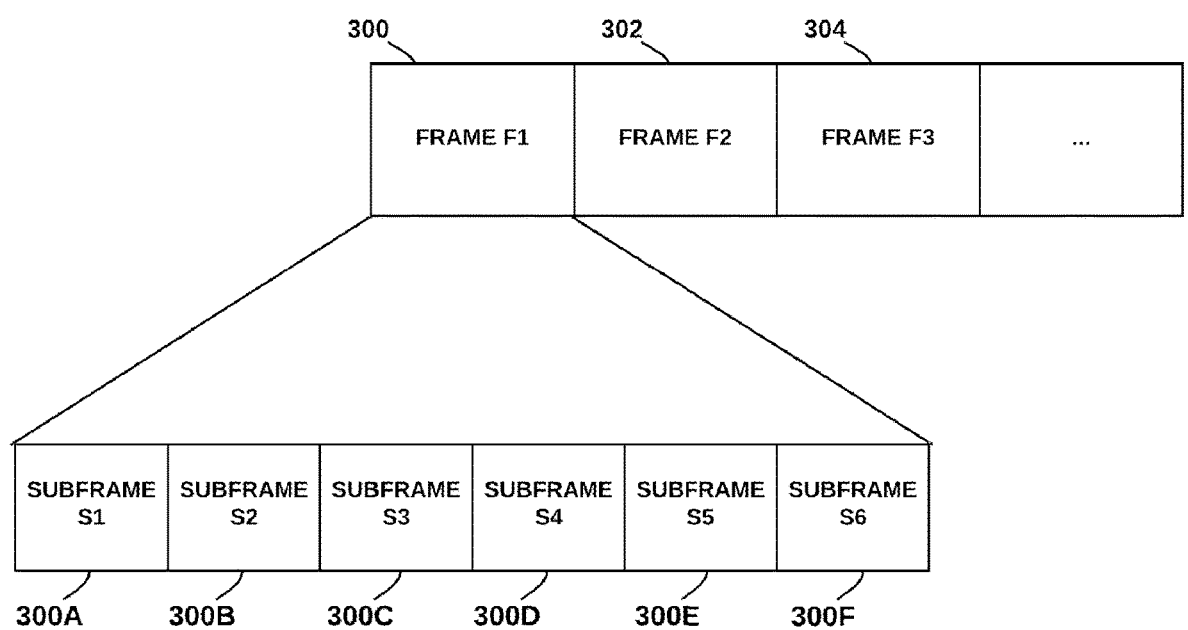
FIG. 3 is a schematic illustrating a visual representation of a series of frames and associated subframes of digital content within a shadow map rotation system, in accordance with one embodiment.

In accordance with an embodiment, at operation 204 of the method 200, the shadow map rotation module 126 determines a rotation angle and a duration for each subframe of the number of subframes. The determination of the rotation angle for each subframe may be based on the subframe parameter data such that the rotation angle for each subframe is consistent with the number of subframes and the total rotation angle. Similarly, the determination of the subframe duration may be based on the subframe parameter data such that the duration of the rotation angle for each subframe is consistent with the number of subframes and a total frame duration. For example, based on the subframe parameter data providing a total rotation angle of 90 degrees, and the number of subframes being 15, then each subframe rotation angle is determined to be incremented by 6 degrees from a previous subframe rotation angle (e.g., subframe 1 at 6 degrees, subframe 2 at 12 degrees, subframe 3 at 18 degrees, subframe 4 at 24 degrees, and the like up to a last subframe at 90 degrees). A first subframe rotation angle may start at zero degrees or at an offset (e.g., with zero degrees being vertical). In accordance with an embodiment, the subframe duration is an amount of time (e.g., in milliseconds (ms) between two frames covered by a subframe. The subframe duration may be equal for all subframes, or the subframe duration may be different for each subframe. Based on the subframe duration being equal for all subframes, the duration may be calculated by dividing a full frame time (e.g., a time for a single frame) by the number of subframes. A full frame time can be any duration and is related to a number of full frames per second required by the application 124 or by a creator using the application 124 or by a desired output; examples of full frame times include 41.66 ms for 24 full frames per second (e.g., typical frame rate for movies), 33.33 ms for full frames per second, 16.66 ms for 60 full frames per second (e.g., typical frame rate for televisions and computer monitors), 11.11 ms for 90 frames per second (typical frame rate for mixed reality HMDs), and the like. As an example, based on 60 full frames per second and 15 subframe, then each subframe would have a duration of approximately 1.11 ms. In accordance with an embodiment, and illustrated in FIG. 3 is a visual representation of a series of three frames (e.g., Frame F1 300, Frame F2 302 and Frame F3 304) wherein a first frame Frame F1 300 is divided into a plurality of subframes. In the example shown in FIG. 3, Frame F1 300 is divided into 6 subframes (Subframe S1 300A to Subframe S6 300F). In accordance with an embodiment, each subframe of the 6 subframes would have an associated duration and angle. The frames shown in FIG. 3 may be part of a video, movie, television program, or other content.

In accordance with an embodiment and referring back to FIG. 2A, at operation 206 of the method 200, the shadow map rotation module 126 gathers data describing a set of lights in the environment. In accordance with an embodiment, the set of lights includes lights which are involved in lighting the environment. A list of lights to be included in the set of lights may be included within the request from the rendering pipeline (e.g., received in operation 202). The data describing the set of lights may include a description of properties associated with each light within the set of lights. The description may include the following: data describing a type of light (e.g., spot light, point light, line light, directional light, plane light, and the like), data describing a location of the light in the environment, data describing an orientation of the light in the environment, data describing properties of the light such as color, intensity and the like in order to define an output of light within the environment emanating from the light.

Figure 2B:
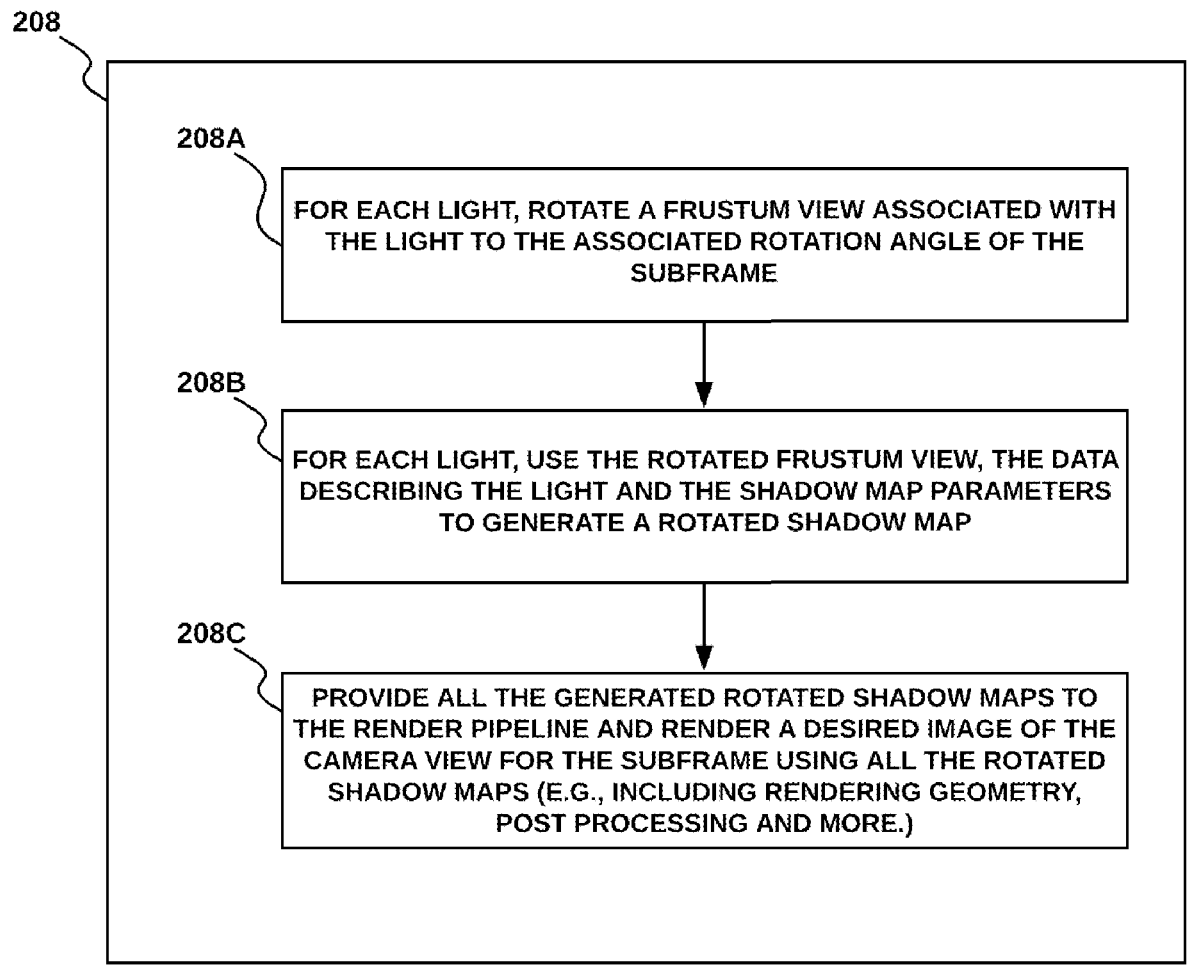
FIG. 2B is a flowchart illustrating a method for rendering an image for a subframe using a shadow map rotation system, in accordance with one embodiment.

In accordance with an embodiment, at operation 208 of the method 200, for one subframe of the plurality of subframes, the shadow map rotation module 126 loops through each light of the set of lights, generates a shadow map for each light based in part on the associated angle for the subframe, and renders an image for the subframe using all the generated shadow maps. In accordance with an embodiment, the rendering is performed by the rendering pipeline using one or more of the following: geometry shaders, vertex shaders, compute shaders, fragment shaders, and more. The rendering may include post processing effects. In accordance with an embodiment, as described below and shown in FIG. 2B is a flowchart illustrating additional details included within operation 208. In accordance with an embodiment, as part of operation 208, the shadow map rotation module 126 may loop through only lights of a predetermined type (or a plurality of different types) within the set of lights to generate a shadow map for each light of the type. For example, the shadow map rotation module 126 may only loop through a set of spot lights within the set of lights (e.g., or only point lights, or only plane lights, or the like).

In accordance with an embodiment, at operation 210 of the method 200, the shadow map rotation module 126 adds the rendered image for the one subframe into a single image using an accumulation buffering technique. The accumulation buffering technique may be any technique that can accumulate a plurality of images into a single image (e.g., using a buffer). In accordance with an embodiment, operation 210 is performed for a plurality of rendered images (e.g., using one rendered image for each subframe determined in operation 204) creating an accumulated or averaged single image for the plurality of subframes. In accordance with an embodiment, the accumulating of rendered images in operation 210 also accumulates (e.g., and averages) noise and artifacts within shadows generated during the rendering of each subframe (e.g., with each subframe having a shadow map at a different angle). The noise and artifacts within rendered shadows of a rendered image are based in part on shadow map angles for each light source used in the rendering. Accordingly, each rendering performed for the various rotated shadow maps in operation 208 may add unique visual noise and artifacts within shadows of the accumulated image. The accumulating of the noise and artifacts (e.g., within shadows) helps to smooth out rendered shadows in the accumulated single image.

In accordance with an embodiment, at operation 212 of the method 200, the operations 208 and 210 are looped for each subframe such that each subframe goes through operation 208 and 210. In accordance with an embodiment the looping is done progressively from a first subframe (e.g., Subframe S1 300A) to a last subframe (e.g., Subframe S6 300F) with increasing associated angles. In accordance with an embodiment, as part of the looping, at operation 212, based on the rendering of the subframes not being complete, a next subframe is selected and operation 208 and 210 are repeated on the next subframe (e.g., with an associated next angle) leading to an updated single image in operation 210.

In accordance with an embodiment, at operation 214 of the method 200, based on a completion of processing of the plurality of subframes determined in operation 204, the shadow map rotation module 126 exports a final single image for the frame, wherein the final single image is the accumulated rendered image generated in operation 210. The final single image may be exported back to the rendering pipeline for further processing (e.g., image post processing), including using the final single image as a frame (e.g., Frame 1 300) in a video. Optionally, if there is a next frame to process using the method 200, the shadow map rotation module 126 may loop back to operation 202 and work on the next frame. In accordance with an embodiment, based on completion of the accumulated single image (e.g., including the exporting of the image), the shadow map rotation module 126 may clear a buffer associated with the accumulation of the image (e.g., a buffer used in operation 210 may be cleared prior to working on the next frame).

In accordance with an embodiment, and shown in FIG. 2B, are additional details describing operation 208. In accordance with an embodiment, at operation 208A, the shadow map rotation module 126 rotates a frustum view associated with a light of the set of lights, wherein the rotation brings the frustum view to the associated angle of the subframe. In accordance with an embodiment, the rotation of the frustum view does not rotate the light itself (e.g., the distribution of light within the environment is unchanged), but rather the rotation of the frustum view rotates a view into the environment from a point associated with the light, wherein the frustum view is used to generate a shadow map. In operation 208A, the shadow map rotation module 126 may rotate the frustum view for each light of the set of lights to the associated angle of the subframe.

In accordance with an embodiment, at operation 208B within operation 208, the shadow map rotation module 126 generates a rotated shadow map for each light of the set of lights. In accordance with an embodiment, the rotated shadow map for a light is generated based on shadow map parameters for the light, properties for the light, and the rotation angle associated with the subframe (e.g., using the rotated frustum view). The rotated frustum view is used to generate the rotated shadow map (e.g., a texture) from a point of view of the light looking into the environment via the rotated frustum view. In accordance with an embodiment, the rotated shadow map may have a similar data structure as a texture, and the rotated shadow map for the light may be generated in a similar way to how a camera generates a depth texture. For example, consider a camera positioned in a same location as the light, and looking through the rotated frustum, areas of the environment that cannot be seen are the same areas of the environment that rays from the light cannot reach; therefore, they are in shadow, and are recorded as such in the shadow map. In accordance with an embodiment, the shadow map rotation module 126 may populate the shadow map with information about a distance travelled by rays from the light before hitting a surface. Each rotation of the frustum view for a light will generate a different shadow map because of a grid-like nature of a shadow map texture (e.g., even while the frustum view is pointed towards a same part of the environment from a same position of the light). Each point in the grid is referred to as a texel (e.g., similar to a pixel of an image). For example, the shadow map for a light may be generated by capturing shadow data in a grid format (e.g., a grid of texels) looking through the rotated frustum, wherein the grid is rotated along with the frustum (e.g., as described with respect to FIG. 4A and FIG. 4B). Data within each texel is an average of shadow data from a part of the environment seen through one part of the grid via the rotated frustum. A lower resolution shadow mask has larger grid elements (e.g., larger texels) and includes averaging from a larger part of the environment and may produce lower quality shadows when used in rendering (e.g., within operation 208C). A mismatch between texel size in a shadow map and screen pixel size in a rendered image using the shadow map can lead to artifacts in the rendered image (e.g., when the texel is larger than the pixel). The rotation of the frustum to generate rotated shadow maps performed within operation 208B is performed in part to average the artifacts and produce higher quality rendered images (e.g., regardless of texel size).

In accordance with an embodiment, at operation 208C, the shadow map rotation module 126 provides the generated rotated shadow maps (e.g., from operation 208B) for the subframe to the render pipeline for rendering an image from the camera view (e.g., the camera view described in the rendering request received in operation 202). In accordance with an embodiment, the render pipeline uses the provided rotated shadow maps for the subframe to render the image for the subframe. The rendering may include rendering geometry, post processing the image and more. In accordance with an embodiment, shadows in the rendered image may be generated using the rotated shadow maps within a fragment shader operation within the rendering operation. In accordance with an embodiment, operation 208C allows the render pipeline to control aspects of rendering the image with the exception of the generation of shadow maps. In accordance with an embodiment, operation 208C may include filtering of the shadow maps and filtering of shadows generated in a rendered image during the rendering process. However, filtering (e.g., percentage-closer filtering PCF) may be performed at a cost of losing precision, sharpness and introducing light leak in the rendered image. Various operations in the method 200, including operation 208C may be compatible with filtering, but can be performed without filtering. In accordance with an embodiment, filtering may be a configurable option (e.g., set by a programmer or administrator).

In accordance with an embodiment, during a subframe loop for a single frame (e.g., including operation 208, operation 210 and operation 212), the environment, the camera view and the lights do not change. For example, based on the subframes in a subframe loop being linked to the single frame, the environment data, light data and camera view data does not change (e.g., the data is constant for all the subframes of the subframe loop).

Figure 4A:
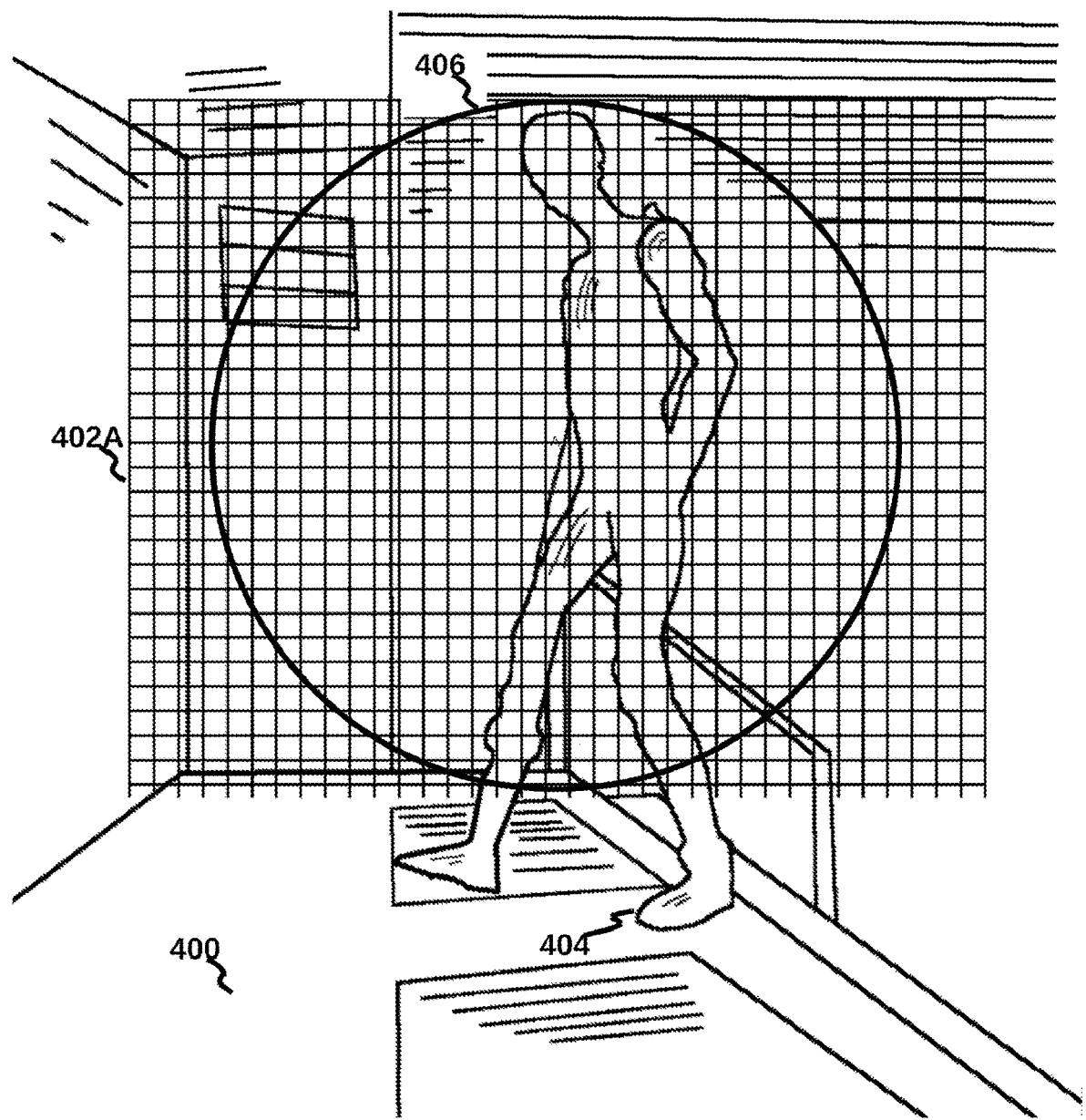
FIG. 4A is a schematic illustrating a shadow map grid oriented horizontally for a shadow map rotation system, in accordance with one embodiment.

In accordance with an embodiment, FIG. 4A is an illustration of a frustum view of an instance of a scene in an environment 400 from a point of view of a light. In accordance with an embodiment, FIG. 4A represents a first subframe for a frame. In accordance with an embodiment, the instance of the scene includes a character 404 at the top of a set of stairs. The frustum view is denoted by a grid 402A and is meant as an illustration of a frustum view that is used to generate a shadow map of the environment 400 for the light (e.g., generated as described in operation 208B), wherein the shadow map is associated with the first subframe. The grid 402 represents a window view into the environment 400 from the point of view of the light. A boundary 406 in FIG. 4A is shown as an example boundary for direct light rays emanating from the light and interacting with the environment 400 and creating shadows. The boundary 406 shown in FIG. 4A is shaped as a circle based on the light being a spotlight; however, the boundary 406 may take on any arbitrary shape based on a type of the light. In accordance with an embodiment, a minimum size of the frustum view may be determined to ensure that the entire boundary 406 is included in the frustum view. In FIG. 4A, the grid 402A is horizontal and may represent a starting point for a first subframe in the subframe loop wherein the frustum is horizontal (e.g., as described in operation 208A). The squares in the grid 402A represent texels in the shadow map and are shown for ease of explanation. Furthermore, the size of the squares in the grid 402A may be exaggerated for ease of explanation. In accordance with an embodiment, and as shown in FIG. 4A, the boundary 406 and the grid 402 may be of different shape. Improved performance of the method 200 may be achieved when the grid 402 fully includes the boundary 406 for all subframe rotation angles (e.g., during operations 208, 210 and 212).

Figure 4B:
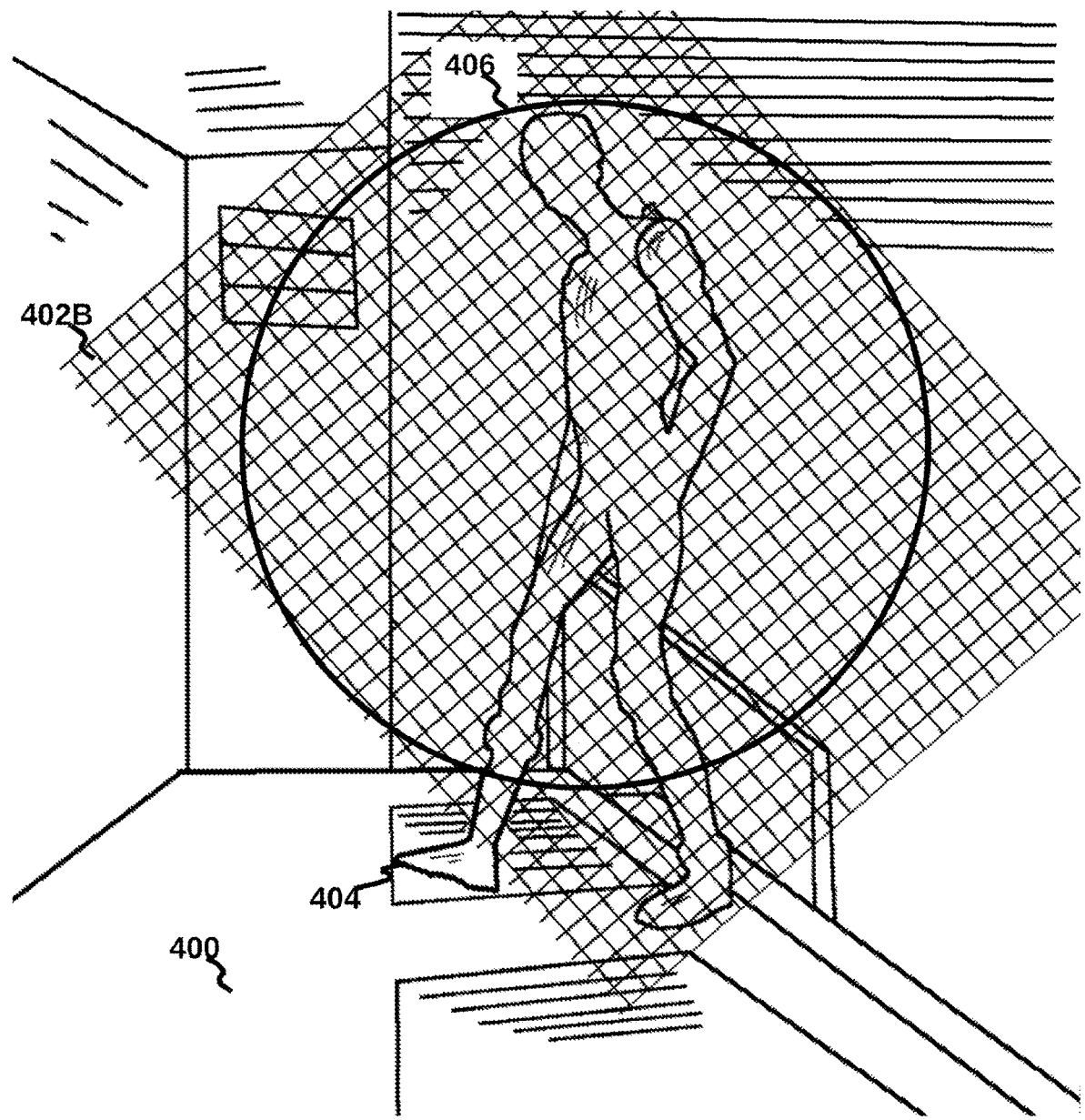
FIG. 4B is a schematic illustrating a shadow map grid oriented at an angle from horizontal for a shadow map rotation system, in accordance with one embodiment.

In accordance with an embodiment, FIG. 4B is an illustration of a second rotated frustum view of the same instance of the scene from FIG. 4A from the point of view of the light. In accordance with an embodiment, FIG. 4B represents a second subframe for the frame shown in FIG. 4A. The second rotated frustum view is denoted by a rotated grid 402B and is meant as an illustration of the second rotated frustum view that is used to generate (e.g., generated as described in operation 208B) a rotated shadow map of the environment 400 for the light), wherein the rotated shadow map is associated with the second subframe. In FIG. 4B the grid is rotated and may represent a subframe within the subframe loop wherein the frustum has been rotated by approximately 45 degrees from horizontal (e.g., as described in operation 208A). The squares (e.g., texels) in the rotated grid 402B capture shadows in the scene 400 (e.g., capture in a shadow map) from a different orientation which may lead to a generation of different artifacts in a rendered image of the scene when compared to artifacts generated from a shadow map created with the grid 402A from FIG. 4A. The boundary 406 shown in FIG. 4B is unchanged from FIG. 4A since the light has not moved (e.g., including a lack of rotation) between the first subframe and the second subframe (e.g., based on the environment (including lights) remaining unchanged for all subframes of a frame).

In accordance with an embodiment, the grid 402A in FIG. 4A and the rotated grid 402B in FIG. 4B represent a uniform two-dimensional (2D) shadow map wherein the resolution of the shadow map is uniform. A uniform 2D shadow map may be used to represent light from a spotlight. Other types of shadow maps may be used to represent other types of lights (e.g., directional lights, point lights, planar lights, and the like) in the operations described with respect to the method 200 shown in FIG. 2A and FIG. 2B. For example, cascaded shadow maps which have a plurality of sections, wherein each section has a different resolution, may also be used in the operations of the method 200. A cascaded shadow map may be used to represent light for directional light (e.g., light which illuminates an environment uniformly from a single direction and which appears to come from infinitely far away; e.g., such as sunlight).

In accordance with an embodiment, taking into consideration that a spotlight (e.g., which generates a cone of light within the environment) only generates shadows within a circular area inside of a square shadow map, the subframe rotation of operation 208 and the accumulation of operation 210 can be applied with a grid (as shown in FIG. 4A and FIG. 4B) without losing shadow coverage. In accordance with an embodiment, and based on a type of light, operation 208 may be performed using a mask to block out shadows outside of a circle similar to the circle in FIG. 4A and FIG. 4B. In accordance with an embodiment, the mask may be circular and be similar to the boundary 406 in FIG. 4A and FIG. 4B. For example, a mask could be used to render shadows within a boundary of the mask using the method 200 shown in FIG. 2A and FIG. 2B, while shadows outside of the mask boundary (e.g., outside of the boundary 406) may be rendered using alternative methods. As an example, and in accordance with an embodiment, a mask may be used with a directional type of light since the light type would fill any shape or size of frustum leading to possible edge artifacts for non-circular frustums, which would be mitigated with a mask. In accordance with an embodiment, an increase in a number of subframes and subframe angles may reduce an amount of artifacts due to a non-circular frustum.

In accordance with an embodiment, though shown in FIG. 4A and FIG. 4B with a rectangular frustum view, the method 200 may use any shaped frustum view in operation 208. For example, a rotationally symmetric frustum view may provide shadows with fewer artifacts.

Figure 5:
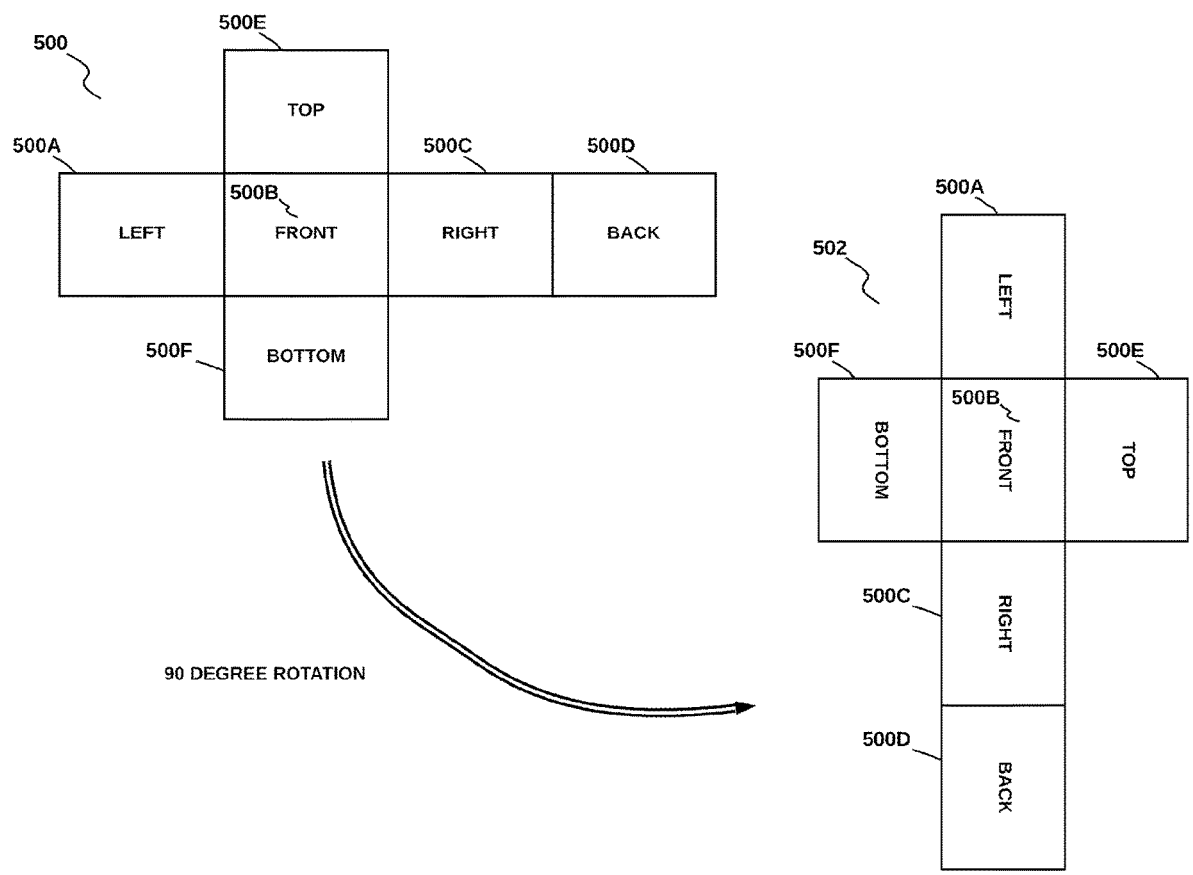
FIG. 5 is a schematic illustration of a cube map shadow map at two different rotations within a shadow map rotation system, in accordance with an embodiment.

In accordance with an embodiment, and shown in FIG. 5, is an unfolded cube shaped shadow map 500 which may be used in the operations of the method 200 (e.g., during operation 208). A cube shaped shadow map may be constructed as a shadow map for a point light source based on light from the point source traveling in all directions within an environment, and wherein shadow maps on the surface of the cube are determined with the point light at a center of the cube. In accordance with an embodiment, the cube shadow map may be determined using six frustums pointing in the six directions of the cube faces and with each frustum originating from a position of the point light (e.g., one frustum for each cube face). In accordance with an embodiment, the cube shadow map 500 for a light in an environment may include six 2D shadow maps representing six faces of the cube (e.g., six 2D shadow map textures), the six faces representing six directions of light travel wherein each of the six faces is similar to a 2D shadow map for a direction associated with a face, and contains a grid of texels (grid not shown in FIG. 5). For example, there may be a 'Bottom' 2D shadow map 500F within the cubemap 500 representing a shadow map of the environment in a downward direction from the light (e.g., determined using a downward facing frustum). Similarly, there may be a 'Top' 2D shadow map 500E within the cubemap 500 representing a shadow map of the environment in an upward direction from the light (e.g., determined using an upward facing frustum). Similarly, there may be a 'Left' 2D shadow map 500A, a 'Front' 2D shadow map 500B, a 'Right' 2D shadow map 500C and a 'Back' 2D shadow map 500D within the cubemap 500 representing 4 horizontal directions from the light (e.g., determined using 4 horizontally directed frustums). In accordance with an embodiment, FIG. 5 also shows a possible rotated cubemap 502 wherein the entire cubemap 500 has been rotated (e.g., as part of operation 208) as a unit about the point light (e.g., rather than each individual cube face being rotated).

Figure 6A:
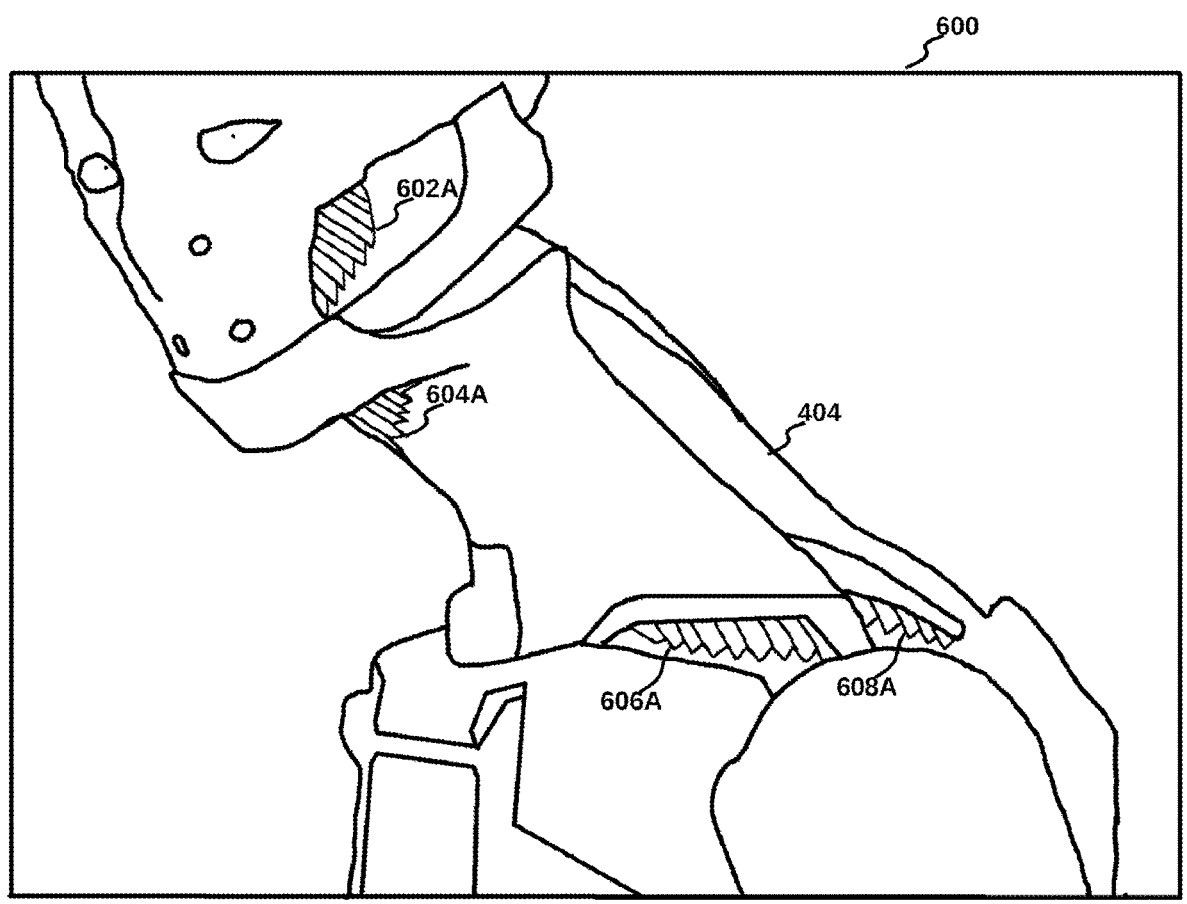
FIG. 6A is a schematic illustration of a rendered image associated with a subframe showing rough shadow edges within a shadow map rotation system, in accordance with an embodiment.

In accordance with an embodiment, FIG. 6A is an illustration of a rendered image 600 for a single subframe within the method 200 (e.g., a rendered image from operation 208C). The rendered image 600 may represent a close-up shot of the character 404 shown in FIGS. 4A and 4B. The rendered image shows a plurality of shadows with jagged edges (602A, 604A, 606A and 608A) on the character 404. The jagged edges on the plurality of shadows (602A, 604A, 606A and 608A) are artifacts of rendering using a shadow map generated in operation 208B for a single subframe (e.g., wherein the shadow map may have been generated from a frustum view at a first angle). A second rendered image (not shown in FIG. 6A) of the same frame but for a second subframe (e.g., wherein a shadow map for the second subframe may have been generated from a frustum view rotated to a second angle) may have slightly different artifacts with different jagged edges.

Figure 6B:
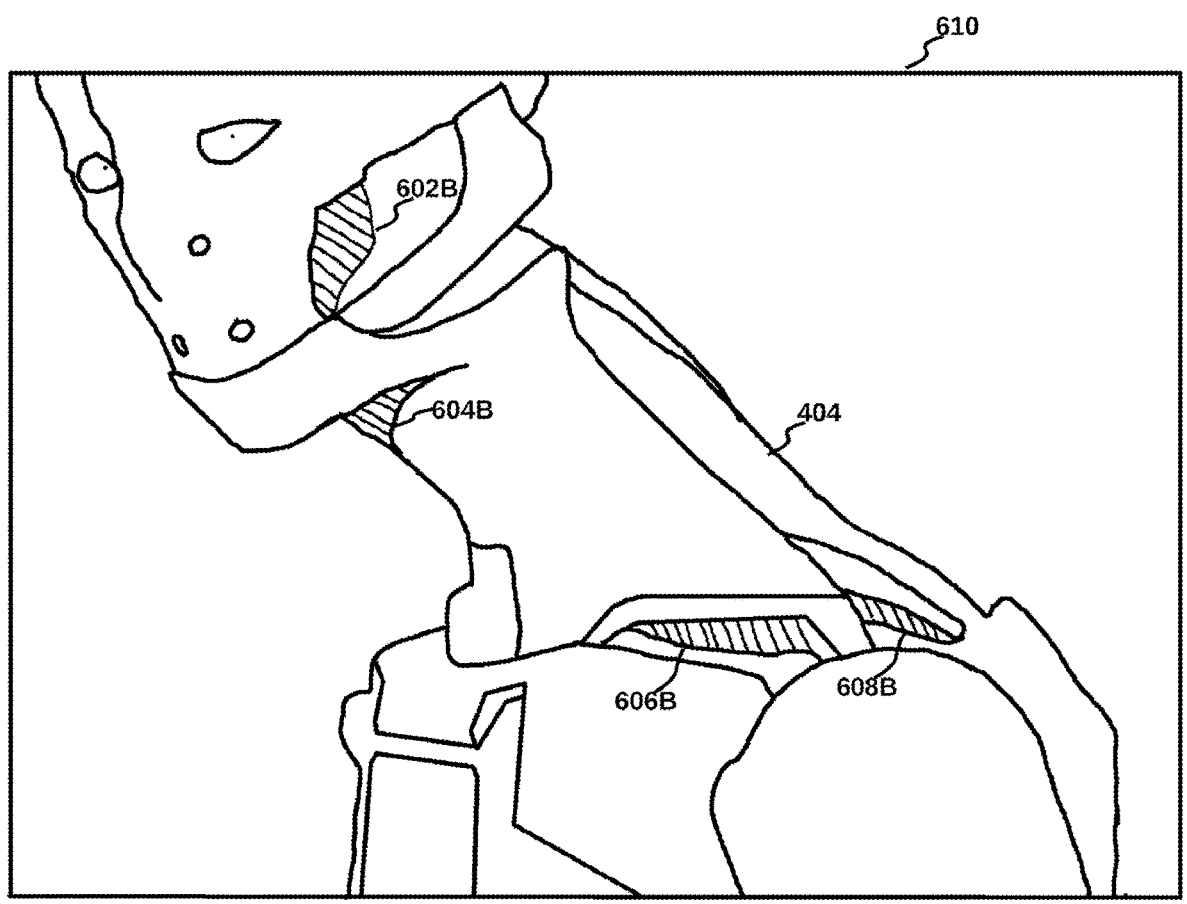
FIG. 6B is a schematic illustration of a rendered image associated with a subframe showing smooth shadow edges within a shadow map rotation system, in accordance with an embodiment.

In accordance with an embodiment, FIG. 6B is an illustration of an accumulated (e.g., averaged) rendered image 610 for a plurality of subframes within the method 200. For example, the accumulated rendered image 610 may be generated as part of operation 210 of the method 200 (e.g., and used in operation 214). The accumulated image 610 is an averaging of a plurality of images rendered for each subframe (e.g., image 600). The accumulated image 610 illustrates an averaging of shadow artifacts from each rendered subframe image (e.g., image 600). A plurality of smooth shadows (602B, 604B, 606B and 608B) represent an averaging of the jagged shadows (602A, 604A, 606A and 608A) within each subframe respectively.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
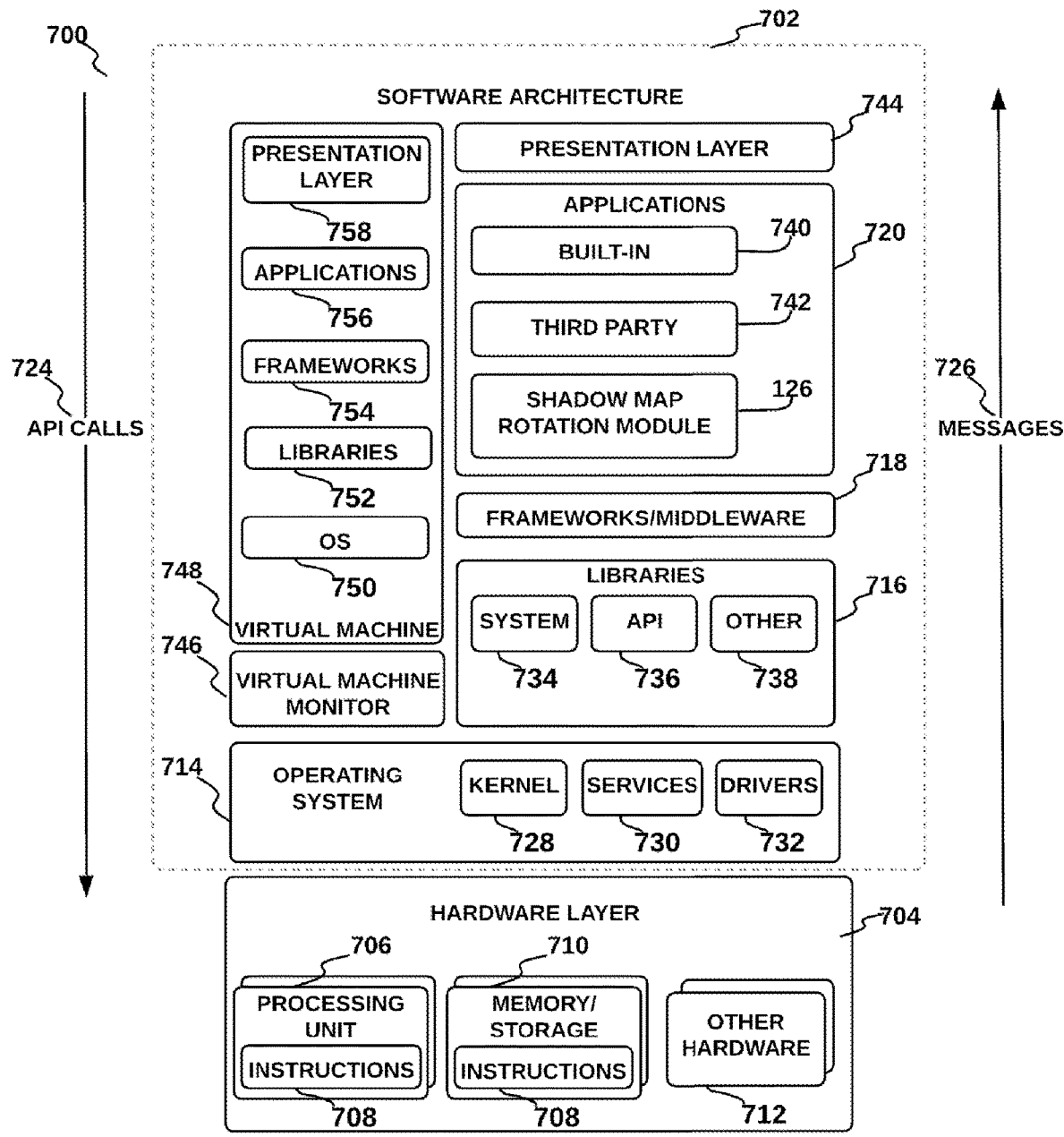
FIG. 7 is a block diagram illustrating an example software architecture, which may be used in conjunction with various hardware architectures described herein.

FIG. 7 is a block diagram 700 illustrating an example software architecture 702, which may be used in conjunction with various hardware architectures herein described to provide a gaming engine 701 and/or components of the shadow map rotation system 100. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 7, this is illustrated by a virtual machine 748. The virtual machine 748 creates a software environment where applications/modules can execute as if they were executing on a hardware machine (such as the machine 800 of FIG. 8, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 8:
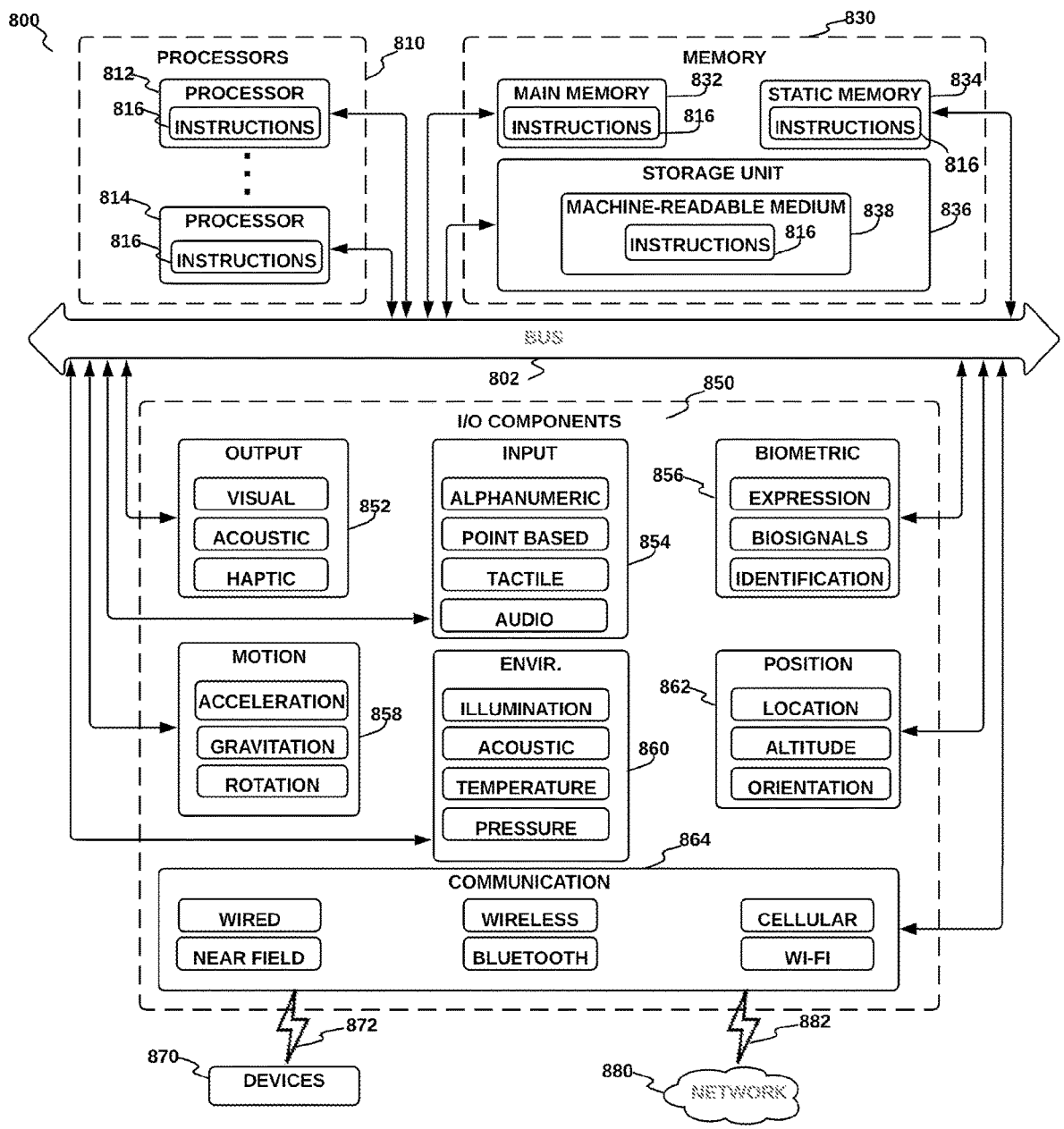
FIG. 8 is a block diagram illustrating components of a machine, according to some example embodiments, configured to read instructions from a machine-readable medium (e.g., a machine-readable storage medium) and perform any one or more of the methodologies discussed herein.

FIG. 8 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the shadow map rotation device 104. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 8. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
   one or more computer processors;
   one or more computer memories;
   a set of instructions stored in the one or more computer memories, the set of instructions configuring the one or more computer processors to perform operations comprising:
   accessing environment data for an environment corresponding to a frame of a video;
   determining a plurality of subframes associated with the frame;
   determining a rotation angle for each of the plurality of subframes based on a total rotation angle associated with the plurality of subframes and a count of the plurality of subframes;
   selecting one or more lights corresponding to the environment;
   generating, for a light of the one or more lights, a shadow map, the shadow map corresponding to a subframe of the plurality of subframes based on a frustum view oriented at the rotation angle determined for the subframe, the frustum associated with the light; and
   rendering an image of the environment, the rendering including using the generated shadow map for the light of the one or more lights.

2. The system of claim 1, the operations further comprising:
   generating, for each light of the one or more lights, an additional shadow map, the additional shadow map corresponding to an additional subframe of the plurality of subframes based on a frustum view oriented at the rotation angle determined for the additional subframe; and
   wherein the rendering includes using the additional generated shadow map for each light of the one or more lights.

3. The system of claim 2, the operations further comprising:
   creating an averaged single image for the subframe and the additional subframe; and
   using the averaged single frame as the image.

4. The system of claim 3, wherein the creating of the averaged single image includes adding a rendered image and an additional rendered image into an accumulation buffer, the rendered image corresponding to the subframe and the additional rendered image corresponding to the additional subframe.

5. The system of claim 1, wherein the selecting of the one or more lights is based on a type of the light.

6. The system of claim 1, wherein the type of the light is one of a spot light, point light, line light, directional light, or plane light.

7. The system of claim 1, wherein the frustum view dimensions are determined in order to include a predetermined percentage of light output interacting with the environment, the light output emanating from the light of the one or more lights, and wherein the determination may additionally be based one or more of the following: a type of the light of the one or more lights or data describing the light output.

8. The system of claim 1, wherein the rendering is from a camera frustum view.

9. The system of claim 1, wherein the rendering is performed by a module that is separate from a rendering pipeline, the module configured to supply the environment data to the rendering pipeline.

10. The non-transitory computer-readable storage medium of claim 1, wherein the type of the light is one of a spot light, point light, line light, directional light, or plane light.

11. A non-transitory computer-readable storage medium storing a set of instructions that, when executed by one or more computer processors, causes the one or more computer processors to perform operations, the operations comprising:
    accessing environment data for an environment corresponding to a frame of a video;
    determining a plurality of subframes associated with the frame;
    determining rotation angle for each of the plurality of subframes based on a total rotation angle associated with the plurality of subframes and a count of the plurality of subframes;
    selecting one or more lights corresponding to the environment;
    generating, for a light of the one or more lights, a shadow map, the shadow map corresponding to a subframe of the plurality of subframes based on a frustum view oriented at the rotation angle determined for the subframe, the frustum associated with the light; and
    rendering an image of the environment, the rendering including using the generated shadow map for the light of the one or more lights.

12. The non-transitory computer-readable storage medium of claim 11, the operations further comprising:
    generating, for each light of the one or more lights, an additional shadow map, the additional shadow map corresponding to an additional subframe of the plurality of subframes based on a frustum view oriented at the rotation angle determined for the additional subframe; and
    wherein the rendering includes using the additional generated shadow map for each light of the one or more lights.

13. The non-transitory computer-readable storage medium of claim 12, the operations further comprising:
    creating an averaged single image for the subframe and the additional subframe; and
    using the averaged single frame as the image.

14. The non-transitory computer-readable storage medium of claim 13, wherein the creating of the averaged single image includes adding a rendered image and an additional rendered image into an accumulation buffer, the rendered image corresponding to the subframe and the additional rendered image corresponding to the additional subframe.

15. The non-transitory computer-readable storage medium of claim 11, wherein the selecting of the one or more lights is based on a type of the light.

16. The non-transitory computer-readable storage medium of claim 11, wherein the frustum view dimensions are determined in order to include a predetermined percentage of light output interacting with the environment, the light output emanating from the light of the one or more lights, and wherein the determination may additionally be based one or more of the following:
    a type of the light of the one or more lights or data describing the light output.

17. The non-transitory computer-readable storage medium of claim 11, wherein the rendering is from a camera frustum view.

18. The non-transitory computer-readable storage medium of claim 11, wherein the rendering is performed by a module that is separate from a rendering pipeline, the module configured to supply the environment data to the rendering pipeline.

19. A method comprising:
    accessing environment data for an environment corresponding to a frame of a video;
    determining a plurality of subframes associated with the frame;
    determining rotation angle for each of the plurality of subframes based on a total rotation angle associated with the plurality of subframes and a count of the plurality of subframes;
    selecting one or more lights corresponding to the environment;
    generating, for a light of the one or more lights, a shadow map, the shadow map corresponding to a subframe of the plurality of subframes based on a frustum view oriented at the rotation angle determined for the subframe, the frustum associated with the light; and
    rendering an image of the environment, the rendering including using the generated shadow map for the light of the one or more lights.

20. The method of claim 19, further comprising:
    generating, for each light of the one or more lights, an additional shadow map, the additional shadow map corresponding to an additional subframe of the plurality of subframes based on a frustum view oriented at the rotation angle determined for the additional subframe; and
    wherein the rendering includes using the additional generated shadow map for each light of the one or more lights.

* * * * *